United States Patent
Jackson et al.

(10) Patent No.: US 7,809,834 B2
(45) Date of Patent: Oct. 5, 2010

(54) METHODS, SYSTEMS, AND COMPUTER PROGRAM PRODUCTS FOR COMMUNICATING USING A HYBRID PHYSICAL NETWORK

(75) Inventors: Stephen S. Jackson, Chapel Hill, NC (US); Matthew B. Squire, Raleigh, NC (US)

(73) Assignee: Hatteras Networks, Durham, NC (US)

( * ) Notice: Subject to any disclaimer, the term of this patent is extended or adjusted under 35 U.S.C. 154(b) by 2376 days.

(21) Appl. No.: 10/357,949

(22) Filed: Feb. 4, 2003

(65) Prior Publication Data

US 2003/0187994 A1 Oct. 2, 2003

Related U.S. Application Data

(60) Provisional application No. 60/354,096, filed on Feb. 4, 2002.

(51) Int. Cl.
*G06F 15/16* (2006.01)
(52) U.S. Cl. .................................... 709/227; 709/229
(58) Field of Classification Search ............... 709/227, 709/229
See application file for complete search history.

(56) References Cited

U.S. PATENT DOCUMENTS

| 5,157,531 | A  | * | 10/1992 | Foglia ......................... 398/135 |
| 5,796,424 | A  | * | 8/1998  | Ely et al. .................... 348/14.1 |
| 6,507,566 | B1 | * | 1/2003  | Noda et al. .................. 370/310 |
| 6,560,200 | B1 | * | 5/2003  | Shinozuka ................... 370/241 |

FOREIGN PATENT DOCUMENTS

GB   2331680 A   *   5/1999

* cited by examiner

*Primary Examiner*—Liangche A Wang
(74) *Attorney, Agent, or Firm*—Myers Bigel Sibley & Sajovec, P.A.

(57) ABSTRACT

Network communication is provided by communicatively coupling a first device with a second device using first and second communication mediums having different bandwidths associated therewith. A communication session is established between the first and the second device so as to transfer data between the first and second devices using the first and second communication mediums. Data is transferred over the first communication medium using a first data rate and data is transferred over the second communication medium using a second data rate that is different than the first data rate. The data is processed at one or both of the first and second devices to account for the difference between the first and second data rates.

28 Claims, 3 Drawing Sheets

METHODS, SYSTEMS, AND COMPUTER PROGRAM PRODUCTS FOR COMMUNICATING USING A HYBRID PHYSICAL NETWORK

RELATED APPLICATIONS

This application claims the benefit of Provisional Application No. 60/354,096, filed Feb. 4, 2002, the disclosure of which is hereby incorporated herein by reference.

BACKGROUND OF THE INVENTION

The present invention relates to communications, and, more particularly, to communication networks.

Communication networks may use different types of communication media based upon their deployment and service requirements. Two examples of communication media commonly used in networks are copper lines and fiber optic cables. Copper networks are characterized by generally low cost transmitters and receivers, but typically provide relatively low transmission speeds. Copper is often used as a communication medium when relatively short distances are involved and relatively low bandwidth is required. Conversely, fiber optic networks are characterized by generally higher cost optical transmitters and receivers, but typically provide relatively high transmission speeds. Fiber is often used as a communication medium when relatively long distances are involved and generally high bandwidth is required.

FIG. 1 illustrates a conventional network model in which a network element device 100 is coupled to a customer equipment device 105 via a communication medium 110. The communication medium may be, for example, a fiber optic cable or a copper wire. In addition, the network element 100, the customer equipment device 105, and the communication medium 110 may comprise part of a network, such as an Ethernet network. The network element device 100 and the customer equipment device 105 may each comprise a communication protocol module 200 as shown in FIG. 2 to implement the Ethernet communication protocol. Ethernet is based on a layered communication protocol model that comprises a physical layer, a data link layer, and higher level protocol layers.

The physical layer comprises a physical coding sublayer (PCS) 205, a physical medium attachment (PMA) sublayer 210, and a physical medium dependent (PMD) sublayer 215, which provides an interface to the physical communication medium 220. The PCS 205 is the sublayer that provides a uniform interface to the data link layer. The PCS 205 provides coding in which 8 bits are represented by 10 bit code groups, which comprise both data symbols and control symbols. The PCS 205 also generates carrier sense and collision detect indications and manages the negotiation process by which the network speed and mode of operation, e.g., full or half duplex, are determined. The PMA sublayer 210 allows the PCS 205 to support various types of serial, bit-oriented physical media by serializing code groups for transmission and de-serializing bits received from the physical medium 220 into code groups. The PMD sublayer 215 defines the physical layer signaling used for various media and defines the physical attachments for different media types.

The data link layer comprises a logical link control (LLC) sublayer 225, a media access control (MAC) sublayer 230, and a reconciliation sublayer (RS) 235. The RS 235 maps a carrier present status signal and an absence of collision status signal into physical signaling primitives that are understood by the MAC sublayer 230. The interface between the data link layer and the physical layer may be a media independent interface (MII) to allow any physical layer to be used with the MAC sublayer 235. Thus, the physical layer may be tailored for a particular physical medium and a particular data rate.

SUMMARY OF THE INVENTION

According to some embodiments of the present invention, network communication is provided by communicatively coupling a first device with a second device using first and second communication mediums having different bandwidths associated therewith. A communication session is established between the first and the second device so as to transfer data between the first and second devices using the first and second communication mediums. Data is transferred over the first communication medium using a first data rate and data is transferred over the second communication medium using a second data rate that is different than the first data rate. The data is processed at one or both of the first and second devices to account for the difference between the first and second data rates.

In some embodiments, the communication session is established using a layered communication protocol, such as the Ethernet communication protocol, that includes a physical layer and a data link layer. The data may be processed at one or both of the first and second devices at the interface between the physical layer and the data link layer to account for the difference between the first and second data rates. In particular, the data may be processed by applying buffering and/or flow control techniques to manage the flow of data between the first and second devices.

In other embodiments, the first and second communication mediums may comprise a copper wire and a fiber optic cable, respectively.

In still other embodiments, the first and second communication mediums may comprise opposing uni-directional links between the first and second devices. In further embodiments, one of the communication mediums may comprise a bi-directional link while the other communication medium comprises a uni-directional link.

Although described primarily above with respect to method aspects of communicating using a hybrid physical network, it will be understood that the present invention may also be embodied as systems and computer program products.

BRIEF DESCRIPTION OF THE DRAWINGS

Other features of the present invention will be more readily understood from the following detailed description of specific embodiments thereof when read in conjunction with the accompanying drawings, in which.

DETAILED DESCRIPTION OF PREFERRED EMBODIMENTS

Figure 1:
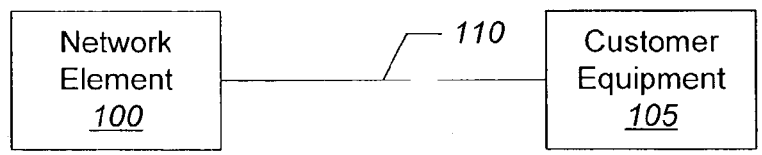
FIG. 1 is a block diagram that illustrates a conventional network model.

While the invention is susceptible to various modifications and alternative forms, specific embodiments thereof are shown by way of example in the drawings and will herein be described in detail. It should be understood, however, that there is no intent to limit the invention to the particular forms disclosed, but on the contrary, the invention is to cover all modifications, equivalents, and alternatives falling within the spirit and scope of the invention as defined by the claims. Like reference numbers signify like elements throughout the description of the figures.

The present invention may be embodied as systems, methods, and/or computer program products. Accordingly, the present invention may be embodied in hardware and/or in software (including firmware, resident software, micro-code, etc.). Furthermore, the present invention may take the form of a computer program product on a computer-usable or computer-readable storage medium having computer-usable or computer-readable program code embodied in the medium for use by or in connection with an instruction execution system. In the context of this document, a computer-usable or computer-readable medium may be any medium that can contain or store the program for use by or in connection with the instruction execution system, apparatus, or device.

The computer-usable or computer-readable medium may be, for example but not limited to, an electronic, magnetic, optical, electromagnetic, infrared, or semiconductor system, apparatus, or device. More specific examples (a nonexhaustive list) of the computer-readable medium would include the following: an electrical connection having one or more wires, a portable computer diskette, a random access memory (RAM), a read-only memory (ROM), an erasable programmable read-only memory (EPROM or Flash memory), an optical fiber, and a portable compact disc read-only memory (CD-ROM).

Figure 3:
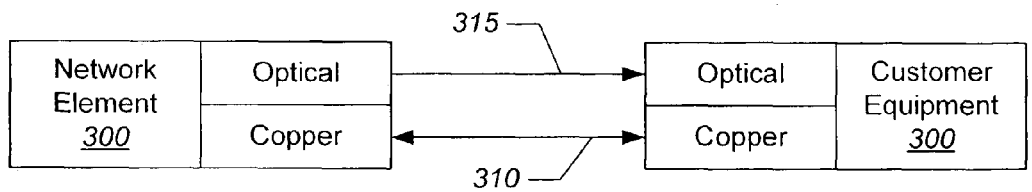
FIG. 3 is a block diagram that illustrates a network model that comprises a hybrid physical network in accordance with some embodiments of the present invention.

Referring now to FIG. 3, a network model for a communication system, in accordance with some embodiments of the present invention, will now be described. As shown in FIG. 3, a network element device 300 is coupled to a customer equipment device 305 via both a copper communication medium 310 and a fiber optic communication medium 315. The network model illustrated in FIG. 3 may be representative of an access network in which there is both a fiber and a copper link between a customer equipment device and a network element device. In some embodiments, the copper communication medium 310 may provide a unidirectional link upstream from the customer equipment device 305 to the network element device 300 and the fiber optic communication medium 315 may provide a unidirectional link downstream from the network element device 300 to the customer equipment device 305. In other embodiments, the copper communication medium 310 may provide a bidirectional link between the customer equipment device 305 and the network element device 310. This may allow the copper communication medium 310 to be used for management purposes or bidirectional connectivity in addition to or in lieu of the fiber link. Advantageously, the copper communication medium 310 may provide a redundant communication path should the optical link fail as optical components have a generally higher failure rate than copper network communication components.

Thus, in accordance with some embodiments of the present invention, the copper communication medium 310 and the fiber optic communication medium 315 may be referred to as a hybrid communication medium that provides asymmetric data rates between two pieces of communication equipment. For example, the network element device 300 may transmit data at a data rate of 1 Gbps towards the customer equipment device 305 over the fiber optic communication medium 315 and the customer equipment device 305 may transmit data at a data rate of 10 Mbps towards the network element device 300 over the copper communication medium 310. Such asymmetry may be particular useful in Internet applications where the amount of data transmitted from the network to the customer is significantly greater than the amount of data transmitted from the customer back into the network.

Figure 4:
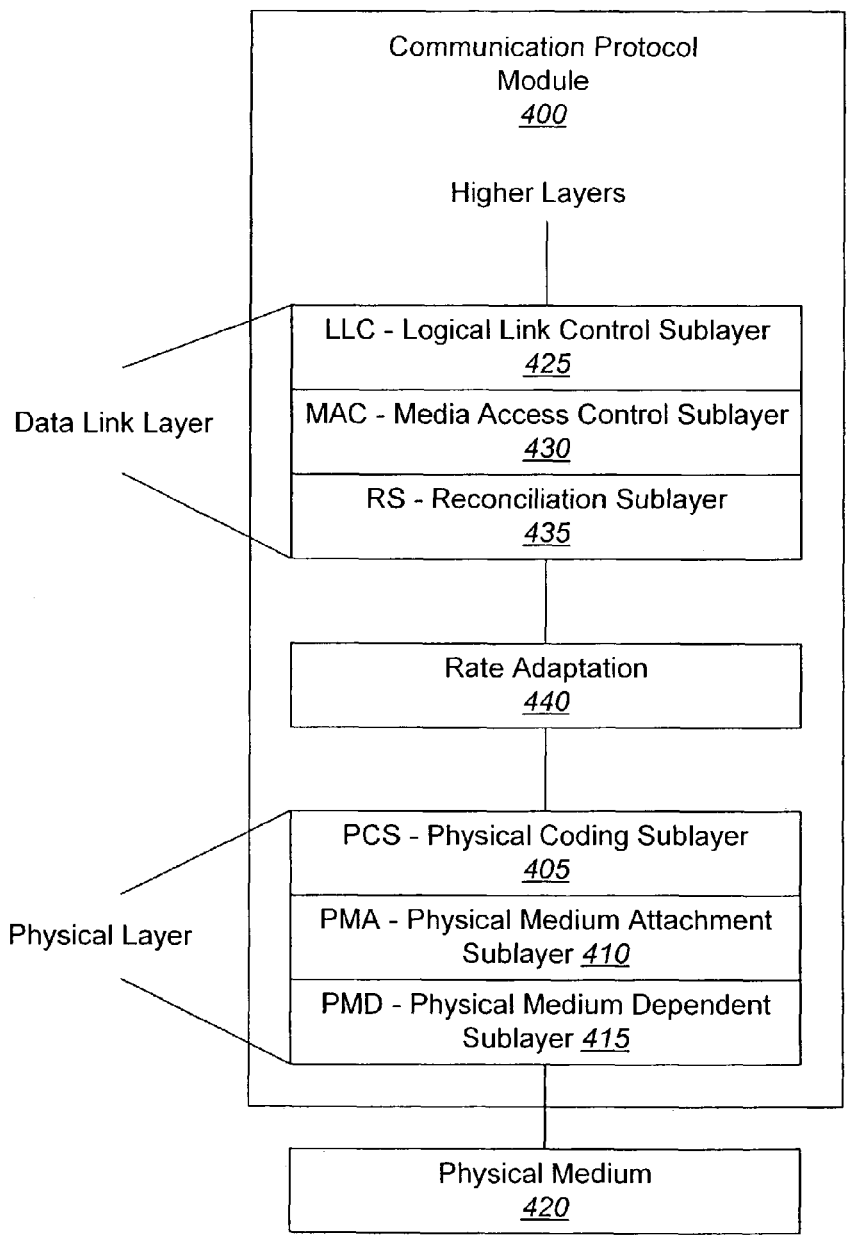
FIG. 4 is a block diagram that illustrates a communication protocol module for use in a communication device in accordance with some embodiments of the present invention.

Because of the difference in data rates between the optical and copper links, the network element device 300 and/or the customer equipment device 305 comprises a communication protocol module 400 as shown in FIG. 4. The communication protocol module 400 is described herein in the context of an Ethernet embodiment. It should be understood, however, that the present invention is not limited to the Ethernet standard and that other communication network protocols may also be used in other embodiments of the present invention.

Figure 2:
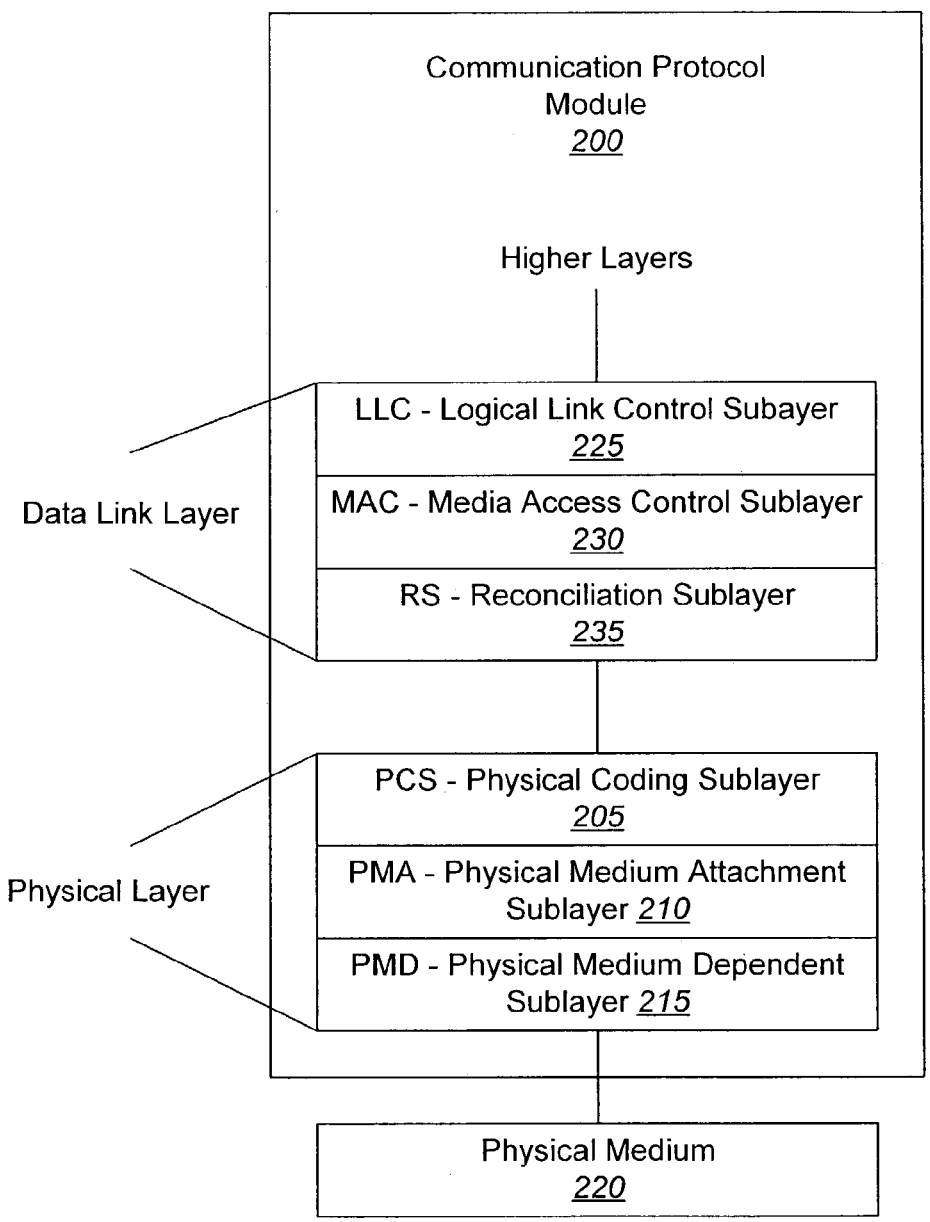
FIG. 2 is a block diagram that illustrates a conventional communication protocol module for use in a communication device.

The communication protocol module 400 is similar to the communication protocol module 200 described above with respect to FIG. 2 and comprises a physical layer, a data link layer, and higher level layers. The physical layer comprises a PCS 405, a PMA sublayer 410, and a PMD sublayer 415, which provides an interface to the physical communication medium 420. The data link layer comprises a LLC sublayer 425, a MAC sublayer 430, and a RS 435. These various sublayers of both the physical layer and the data link layer have been described above with respect to FIG. 2. The communication protocol module 400 differs from the communication protocol module 200 of FIG. 2 in that it further comprises a rate adaptation sublayer 440 at the interface between the data link layer and the physical layer. The rate adaptation sublayer 440 is configured to process the data at the interface between the physical layer and the data link layer so as to account for the difference between the data rates used to transmit and receive data over the copper communication medium 310 and the fiber optic communication medium 315 shown in FIG. 3. In accordance with some embodiments of the present invention, the rate adaptation sublayer 440 may use buffering and/or flow control techniques to manage the communication of data between the network element device 300 and the customer equipment device 305 of FIG. 3.

Although FIGS. 3 and 4 illustrate exemplary network model and communication protocol model architectures in accordance with some embodiments of the present invention, it will be understood that the present invention is not limited to such configurations but is intended to encompass any configuration capable of carrying out operations described herein. For example, the rate adaptation sublayer 440 of FIG. 4 need not be implemented as a separate sublayer at the interface between the data link layer and the physical layer, but instead may be incorporated into one or more of the various sublayers comprising the data link layer and/or the physical layer in accordance with some embodiments of the present invention. It will be further appreciated that the functionality of any or all of the layers and/or sublayers of the communication protocol module 400 of FIG. 4 may be implemented using discrete hardware components, one or more application specific integrated circuits (ASICs), a programmed digital signal processor or microcontroller, or combinations thereof.

The present invention is described hereinafter with reference to flowchart and/or block diagram illustrations of methods, systems, and computer program products in accordance with exemplary embodiments of the invention. These flowchart and/or block diagrams further illustrate exemplary operations of network communications using a hybrid physical network, such as the communication network of FIG. 3, in accordance with some embodiments of the present invention. It will be understood that each block of the flowchart and/or block diagram illustrations, and combinations of blocks in the flowchart and/or block diagram illustrations, may be implemented by computer program instructions and/or hardware operations. These computer program instructions may be provided to a processor of a general purpose computer, a special purpose computer, or other programmable data processing apparatus to produce a machine, such that the instructions, which execute via the processor of the computer or other programmable data processing apparatus, create means for implementing the functions specified in the flowchart and/or block diagram block or blocks.

These computer program instructions may also be stored in a computer usable or computer-readable memory that may direct a computer or other programmable data processing apparatus to function in a particular manner, such that the instructions stored in the computer usable or computer-readable memory produce an article of manufacture including instructions that implement the function specified in the flowchart and/or block diagram block or blocks.

The computer program instructions may also be loaded onto a computer or other programmable data processing apparatus to cause a series of operational steps to be performed on the computer or other programmable apparatus to produce a computer implemented process such that the instructions that execute on the computer or other programmable apparatus provide steps for implementing the functions specified in the flowchart and/or block diagram block or blocks.

Figure 5:
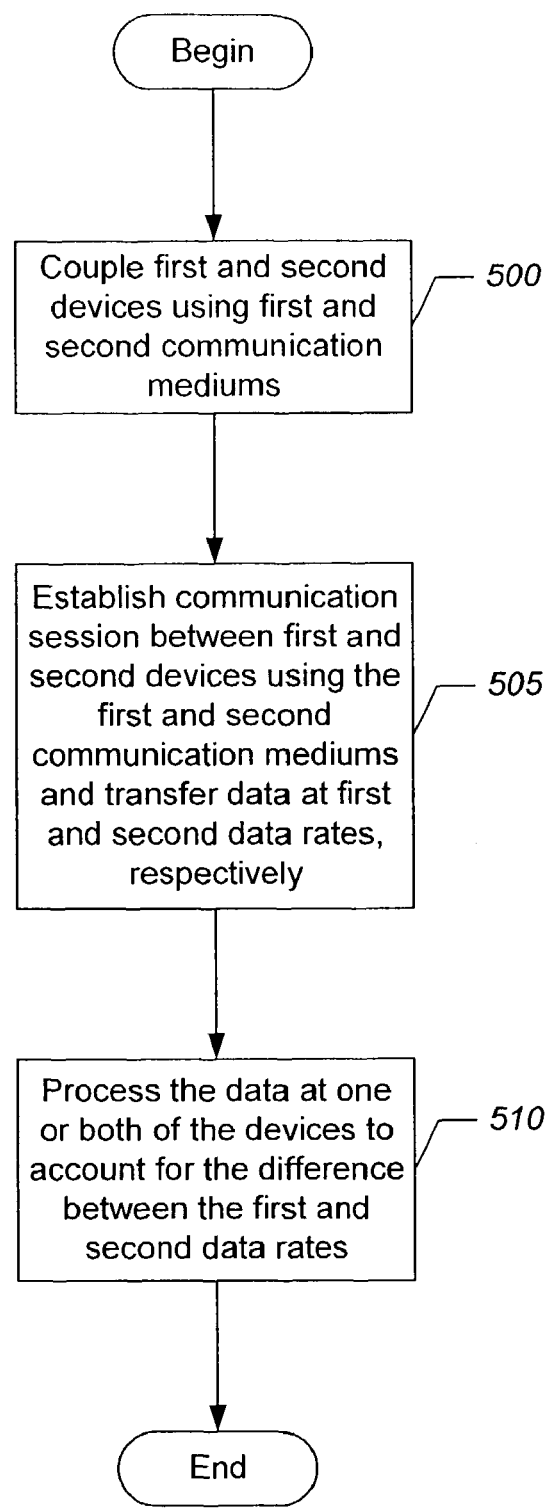
FIG. 5 is a flowchart that illustrates operations for communicating using a hybrid physical network in accordance with some embodiments of the present invention.

Referring now to FIG. 5, operations begin at block 500 where first and second devices, such as the network element device 300 and the customer equipment device 305 of FIG. 3, are coupled using first and second communication mediums, such as the copper communication medium 310 and the fiber optic communication medium 315 of FIG. 3. At block 505, the communication protocol module 400 of FIG. 4, at one or both of the communication devices, facilitates establishing a communication session between the first and second devices using the first and second communication mediums so as to transfer data between the two devices at first and second data rates, respectively. For example, as discussed above, data may be transferred at a high data rate downstream towards the customer equipment device 305 using the fiber optic communication medium 315 while data may be transferred at a lower data rate upstream towards the network element device 300 using the copper communication medium 310. At block 510, the rate adaptation layer 440 of FIG. 4 may process the data at one or both of the devices to account for the difference between the first and second data rates. In some embodiments, the rate adaptation layer 440 may implement buffering and flow control techniques to manage the flow of data between the two devices.

The flowchart of FIG. 5 illustrates the architecture, functionality, and operations of embodiments of the network element device 300 and/or the customer equipment device 305. In this regard, each block represents a module, segment, or portion of code, which comprises one or more executable instructions for implementing the specified logical function(s). It should also be noted that in other implementations, the function(s) noted in the blocks may occur out of the order noted in FIG. 5. For example, two blocks shown in succession may, in fact, be executed substantially concurrently or the blocks may sometimes be executed in the reverse order, depending on the functionality involved.

Advantageously, the methods, systems, and computer program products for communicating using a hybrid physical network discussed above with respect to FIGS. 3-5 may be used to provide an asymmetric cost-optimized communications network with relatively low cost customer equipment as only copper transmitters and optical receivers may be required, and relatively higher cost network equipment.

Many variations and modifications can be made to the preferred embodiments without substantially departing from the principles of the present invention. All such variations and modifications are intended to be included herein within the scope of the present invention, as set forth in the following claims.

We claim:

1. A method of communicating, comprising:
communicatively coupling a first device with a second device using a first communication medium and a second communication medium having different bandwidths associated therewith;
establishing a communication session between the first device and the second device so as to transfer data between the first device and the second device using the first and second communication mediums such that a first data rate is used to transfer data over the first communication medium and a second data rate, different than the first data rate, is used to transfer data over the second communication medium, the data at least partly comprising non-control information; and
processing the data at at least one of the first and second devices to account for the difference between the first and second data rates.

2. The method of claim 1, wherein establishing a communication session comprises:
establishing a communication session using a layered communication protocol that comprises a physical layer and a data link layer; and
wherein processing the data comprises:
processing the data at the interface between the physical layer and the data link layer.

3. The method of claim 2, wherein the layered communication protocol comprises the Ethernet communication protocol.

4. The method of claim 1, wherein the first communication medium comprises a copper wire and the second communication medium comprises a fiber optic cable.

5. The method of claim 1, wherein the first and second communication mediums comprise opposing uni-directional links between the first and second devices.

6. The method of claim 1, wherein the first communication medium comprises a bi-directional link between the first and second devices and the second communication medium comprises a uni-directional link between the first and second devices.

7. The method of claim 6, wherein the first communication medium comprises a copper wire and the second communication medium comprises a fiber optic cable.

8. A communication system, comprising:
a first communication device;
a second communication device; and
first and second communication mediums having different bandwidths associated therewith that couple the first communication device to the second communication device;
wherein the first communication device comprises a communication protocol module that is configured to establish a communication session between the first device and the second device so as to transfer data between the first device and the second device using the first and second communication mediums such that a first data rate is used to transfer data over the first communication medium and a second data rate, different than the first data rate, is used to transfer data over the second communication medium and to process the data to account for the difference between the first and second data rates, the data at least partly comprising non-control information.

9. The communication system of claim 8, wherein the communication protocol module is configured to implement a layered communication protocol that comprises a physical layer and a data link layer, and wherein the communication protocol module further comprises a rate adaptation module that is configured to process the data at the interface between the physical layer and the data link layer to account for the difference between the first and second data rates.

10. The communication system of claim 9, wherein the layered communication protocol comprises the Ethernet communication protocol.

11. The communication system of claim 8, wherein the first communication medium comprises a copper wire and the second communication medium comprises a fiber optic cable.

12. The communication system of claim 8, wherein the first and second communication mediums comprise opposing uni-directional links between the first and second devices.

13. The communication system of claim 8, wherein the first communication medium comprises a bi-directional link between the first and second devices and the second communication medium comprises a unidirectional link between the first and second devices.

14. The communication system of claim 13, wherein the first communication medium comprises a copper wire and the second communication medium comprises a fiber optic cable.

15. A communication system, comprising:
  means for communicatively coupling a first device with a second device using a first communication medium and a second communication medium having different bandwidths associated therewith;
  means for establishing a communication session between the first device and the second device so as to transfer data between the first device and the second device using the first and second communication mediums such that a first data rate is used to transfer data over the first communication medium and a second data rate, different than the first data rate, is used to transfer data over the second communication medium, the data at least partly comprising non-control information; and
  means for processing the data at at least one of the first and second devices to account for the difference between the first and second data rates.

16. The communication system of claim 15, wherein the means for establishing a communication session comprises:
  means for establishing a communication session using a layered communication protocol that comprises a physical layer and a data link layer; and
  wherein the means for processing the data comprises:
  means for processing the data at the interface between the physical layer and the data link layer.

17. The communication system of claim 16, wherein the layered communication protocol comprises the Ethernet communication protocol.

18. The communication system of claim 15, wherein the first communication medium comprises a copper wire and the second communication medium comprises a fiber optic cable.

19. The communication system of claim 15, wherein the first and second communication mediums comprise opposing uni-directional links between the first and second devices.

20. The communication system of claim 15, wherein the first communication medium comprises a bi-directional link between the first and second devices and the second communication medium comprises a uni-directional link between the first and second devices.

21. The communication system of claim 20, wherein the first communication medium comprises a copper wire and the second communication medium comprises a fiber optic cable.

22. A computer program product for facilitating communication over a hybrid physical medium, comprising:
  a non-transitory computer readable storage medium having computer readable program code embodied therein, the computer readable program code comprising:
  computer readable program code configured to communicatively couple a first device with a second device using a first communication medium and a second communication medium having different bandwidths associated therewith;
  computer readable program code configured to establish a communication session between the first device and the second device so as to transfer data between the first device and the second device using the first and second communication mediums such that a first data rate is used to transfer data over the first communication medium and a second data rate, different than the first data rate, is used to transfer data over the second communication medium, the data at least partly comprising non-control information; and
  computer readable program code configured to process the data at at least one of the first and second devices to account for the difference between the first and second data rates.

23. The computer program product of claim 22, wherein the computer readable program code configured to establish a communication session comprises:
  computer readable program code configured to establish a communication session using a layered communication protocol that comprises a physical layer and a data link layer; and
  wherein the computer readable program code configured to process the data comprises:
  computer readable program code configured to process the data at the interface between the physical layer and the data link layer.

24. The computer program product of claim 23, wherein the layered communication protocol comprises the Ethernet communication protocol.

25. The computer program product of claim 22, wherein the first communication medium comprises a copper wire and the second communication medium comprises a fiber optic cable.

26. The computer program product of claim 22, wherein the first and second communication mediums comprise opposing uni-directional links between the first and second devices.

27. The computer program product of claim 22, wherein the first communication medium comprises a bi-directional link between the first and second devices and the second communication medium comprises a uni-directional link between the first and second devices.

28. The computer program product of claim 27, wherein the first communication medium comprises a copper wire and the second communication medium comprises a fiber optic cable.

* * * * *